United States Patent [19]

Laakmann

[11] Patent Number: 4,714,960

[45] Date of Patent: Dec. 22, 1987

[54] TELEVISION RATE OPTICAL SCANNER

[76] Inventor: Peter Laakmann, Highland Dr., The Highlands, Seattle, Wash. 98177

[21] Appl. No.: 740,829

[22] Filed: Jun. 3, 1985

[51] Int. Cl.[4] .............................................. H04N 3/08
[52] U.S. Cl. .................................. 358/206; 358/199; 358/208; 358/113; 350/6.6; 350/6.8
[58] Field of Search ............... 358/199, 206, 208, 256, 358/113, 285, 293, 205, 227; 250/332, 334, 347, 353, 236, 578; 350/6.6, 6.8, 420, 421

[56] References Cited

U.S. PATENT DOCUMENTS

| | | | |
|---|---|---|---|
| 3,532,425 | 10/1970 | Silverberg | 350/6.6 |
| 3,723,642 | 3/1973 | Laakmann | 358/113 |
| 3,760,181 | 9/1973 | Daly et al. | 250/332 |
| 3,764,192 | 10/1973 | Wheeler | 350/6.6 |
| 4,140,363 | 2/1979 | Davis et al. | 350/6.8 |
| 4,141,620 | 2/1979 | Gushima et al. | 350/6.8 |
| 4,204,122 | 5/1980 | Menke | 250/334 X |
| 4,253,724 | 3/1981 | Minoura et al. | 350/6.8 |
| 4,349,843 | 9/1982 | Laakmann et al. | 350/6.8 X |
| 4,367,912 | 1/1983 | Kitamura | 350/6.8 |
| 4,508,422 | 4/1985 | Karlsson | 350/6.8 |
| 4,538,181 | 8/1985 | Taylor | 358/208 |

Primary Examiner—James J. Groody
Assistant Examiner—Victor R. Kostak
Attorney, Agent, or Firm—Leonard Tachner

[57] ABSTRACT

An optical scanner, directly compatible with television imaging or displaying, comprises a unique polygon azimuth mirror scanner which obviates the prior art requirement for atmospheric evacuation and a unique optical system between the azimuth scanner and detector array which permits selected optical modification of detector geometry. The azimuth scanner is designed to be of limited dimensions and is housed in a vented housing within minimal clearance to produce a self-pumping effect which is sufficient to overcome the reduced atmospheric drag. The scanner/detector optical system provides a detector image plane within an optical relay, where in a disclosed embodiment one or two flat refractor plates, oriented at different angles relative to the optical axis, effectively convert a standard linear array into a two-offset array. The resultant system comprises an optical scanner especially suited to using standardized military components such as "common module" pushbroom detector arrays, but which provides the significant cost and performance advantages of serially scanning systems.

26 Claims, 6 Drawing Figures

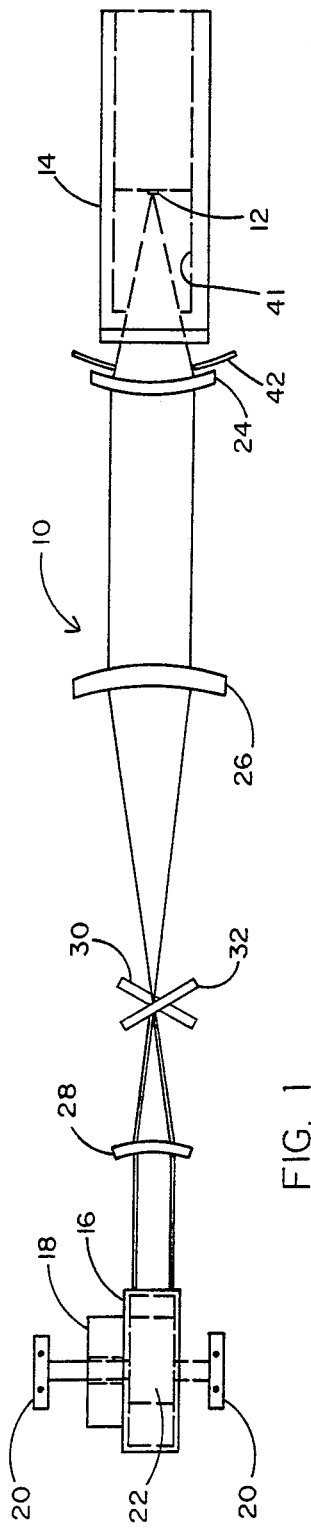
FIG. 1
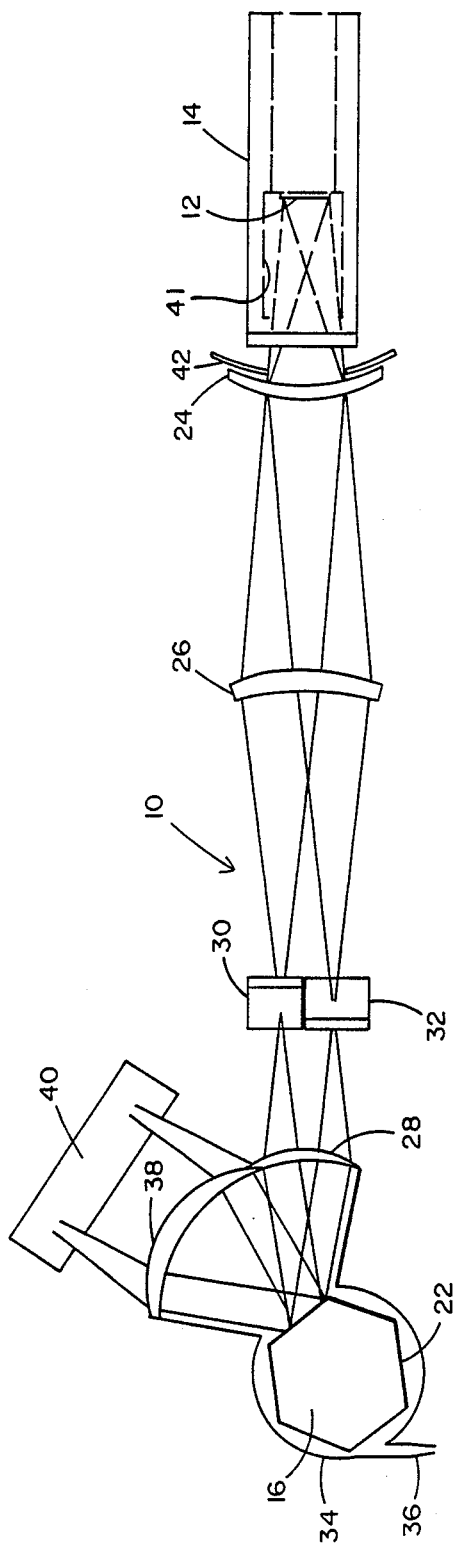
FIG. 2a
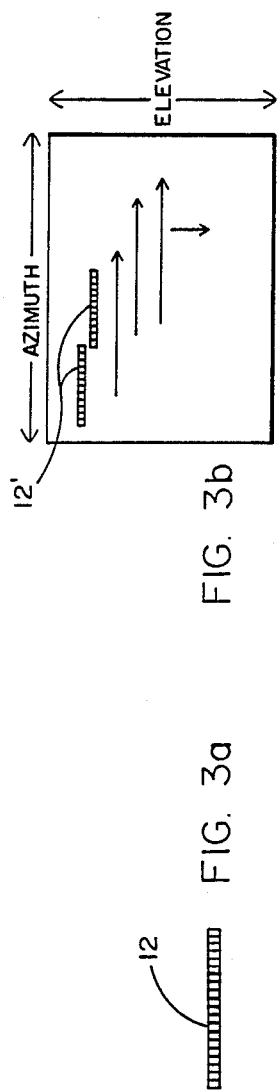
FIG. 3a
FIG. 3b

TELEVISION RATE OPTICAL SCANNER

BACKGROUND OF THE INVENTION

1. Field of the Invention

This invention relates generally to television compatible optical scanners and more particularly to mechanical raster scanners as used in thermal imaging systems, laser display systems, laser radar systems, general purpose optical imaging and television video systems.

2. Prior Art

The invention addresses several continuing problems in electro-optics technology wih special emphasis on those experienced in high performance, high resolution thermal imaging systems (FLIR - Forward Looking InfraRed). The typical fast framing thermal imaging system or Forward Looking InfraRed collects, spectrally, filters and focuses the infrared radiation within the field of view onto an array of detectors. The detectors convert the optical signals into electrical signals which are amplified and processed for display on a video monitor. The image for a high performance system is typically provided on a television-type monitor operating at television frame rates. This is all accomplished in real time. While the special needs of thermal imaging are particularly relevant, the invention is applicable and cost effective for use in the noted additional fields as well.

The technology of using cryogenically cooled infrared detectors sensitive in the long wavelength infrared region between 3.5 and 12 microns to make real time (instantaneous rather than film recorded) images dates back to the early 1960's. In terms of image quality, sensitivity, spatial resolving power, the best devices produced imagery roughly comparable to blank and white television. The design and preformance requirements that dictated the early technology were determined by military tasks which today are essentially unchanged. Infrared detectors with near theoretical performance capability were available then as now so that implementing a given system performance requirement meant simply using a sufficient number of such detectors. Arrays of up to several hundred detectors and mechanical scanners formed the basis of the technology then as now.

All of the high performance thermal imaging systems use one of two mechanical raster scan concepts in combination with an array of cryogenically cooled detectors. One of these concepts employs a large array of up to 180 detectors oriented perpendicular to line scan dimension. The signals from the detectors are amplified and directly displayed by synchronously scanned light-emitting multiplexed to drive a cathode ray tube. This concept is illustrated in U.S. Pat. No. 3,760,181 issued to Daly et al.

A second approach is disclosed in Laakmann, U.S. Pat. No. 3,723,642. In this implementation, a short array of detectors, such as ten to thirty detectors, is scanned two-dimensionally across the image. The detectors are oriented parallel to the line scan dimension of the television raster to be generated. The signals from the detectors are summed appropriately in a delay line and processed to provide the image. Since each detector sees a perfect cold stop, this implementation provides thermal sensitivity equal to the less efficient Daly et al implementation.

An optical scanner which can accomplish two-dimensional scanning at commercial television rates is described in Wheeler, U.S. Pat. No. 3,764,192. The Wheeler patent provides for the generation of a non-astigmatic pupil by generating an apparent pupil onto a facet mirror. Any telescope or relay lens beyond the framing mirror of Wheeler sees a field angle due to both elevation and azimuth scans.

The progress in the technology has been substantial. While the early devices were put together in a research laboratory atmosphere with little concern about cost, modern devices are being built at costs of a few percent (inflation adjusted) of the early sensors. Essentially, progress in the field has been made on the one hand by better materials technology and more cost effective systems technology and on the other hand by conventional manufacturing implementation, standardization and volume manufacturing.

A key element in the evolution of the technology was the development of tri-metal detectors such as Mercury-Cadmium Telluride which permit the use of liquid nitrogen (or argon) cooled detectors at 77 to 90 degrees K rather than the earlier doped germanium detectors that required cooling to 20 to 30 degrees K. The increased operating temperature range of HgCdTe detectors was very significant in simplifying associated refrigerators and also in allowing the use of cryostats and open cycle air, nitrogen or argon gas cooling. However, another significant difference was that the electrical bandwidth of the detector is more than two orders of magnitude larger than the doped germanium detector.

The increased electrical bandwidth of HgCdTe detectors over prior detectors made possible the system disclosed in U.S. Pat. No. 3,723,642. That system implementation capitalized on the bandwidth of the material and made possible thermal imaging systems that produced a direct conventional television video output at the U.S. 525 line rate or the European 625 line rate, at 30 or 25 frames per second, respectively. The detector bandwidth was a direct match to the 4 Mhz televison rate. Since all system detectors see all points of the image serially, these systems are commonly called "serial scan systems".

In contrast with the teaching of U.S. Pat. No. 3,723,642, prior art thermal imaging systems either used special displays having non-standard synchronization rates or used an optical or CRT-type scan converter. The advantages of direct television compatibility without costly and degrading scan converters led to the adoption of this general technology for low cost, high performance thermal imaging systems.

The teaching of Pat. Nos. 3,723,642 and 3,760,181 and a number of later related disclosures of what are commonly called "series-parallel" systems, form the base of thermal imaging sensors. The Daly, et al system implementation (3,760,181), despite its cost and size disadvantages, is the basis for the major share of plant investment and installed sensors for the United States and NATO military market. The most commonly accepted reason for this is that both developments took place in a time frame in which the military was virtually the entire market and it was felt that the need the standardization was most urgent. Because the serial scan technology disclosed in U.S. Pat. No. 3,723,642 had several elements which were not well understood or proven reliable, it was considered to be too risky for a perceived twenty year commitment of U.S. and NATO resources in the amount of many billions of dollars. On the other hand, the Daly, et al implementation was evolutionary and was indeed of low technical risk. A management decision was made by the military to satisfy all applications with the latter technology and initiate heavy funding for factory implementation.

There are many other patents and technologies which relate to commercial, non-military applications of television compatible optical scanners. These systems are generally not concerned with high resolution, long-range reconnaissance but analyze objects at close range or with very wide fields of view. An example is U.S. Pat. No. 4,349,843 to Laakmann, et al. It describes the first direct television rate scanner conceived specifically for low cost infrared radiometry. The difference between a high performance device such as described under serial and parallel Forward Looking InfraRed (FLIR) system sensors and this low cost device is not primarily in the quality of the image or in the thermal sensitivity but in the $D\theta$ product, where D is the diameter of the optics and $\theta$ is the angular extent of each detector in the system, as explained at column 1 beginning at line 60 of the specification of Patent No. 4,349,843.

These parameters are very significant in terms of device manufacturing cost. For example, if one considers the manufacturing cost of the above low cost scanner first, for commercial quantities of about 1,000/year, a figure of about $8,000.00 per system in 1985 dollars should be considered typical. On the other hand, a television compatible Forward Looking InfraRed (FLIR) systems of the parallel variety in the same quantities typically cost the military about $100,000.00 each. The average serial scan Forward Looking InfraRed (FLIR) system has a production cost in similar quantities of about $25,000.00 each. This comparison assumes devices of similar bandwidth (image quality) and thermal sensitivity. It does not include telescopes or other accessories.

The primary element in the cost difference between the low cost device and the serially scanning Forward Looking InfraRed (FLIR) system is the detector and delay line processor as all other elements are essentially the same. In the case of the Daly et al implementation, it is the complicated 180 element detector and high level processor (including the scan converter). The total system cost differences are not due to differences in scanner cost. In fact, the requirement for scanning large $D\theta$ products in non-military applications tends to raise the cost of scanning.

Aside from costs there are other technical considerations in principal favoring a serially scanning system. Chief among these considerations is the freedom from image artifacts and the ability to do image processing of video over a large dynamic range and before sampling. A blackbody referenced true d.c. coupled video is routinely implemented. The inability to provide a true blackbody referenced image in the parallel scanning Forward Looking InfraRed (FLIR) system limits the safe application of these devices as aircraft night navigation and landing aids. The a.c. coupled nature of the processing channels causes blackout (or white out) of the display during banking maneuvers due to the extreme thermal contrast between sky and ground.

U.S. Pat. No. 3,764,192 and U.S. Pat. No. 3,723,642 disclose inventions which are designated for specific tasks in implementing a direct television scan. Both have limitations when applied to the general case of scanning in military performace Forward Looking InfraRed (FLIR) systems. One of the limitations of both is that they are limited in the number of detector elements that they can scan in a television compatible system. A second limitation is that the ball bearings are operated in a vacuum to facilitate drag reduction for the relatively large polygon mirror and to permit operation at low power. This causes evaporation of lubricant and reduces bearing life.

Another important limitation is that the detector array has to be tailored to each scanner design, rather than using "off the self" arrays for which tooling and proven implementation exists.

SUMMARY OF THE INVENTION

The present invention utilizes at least two highly advantageous features relative to the prior art to provide a television compatible optical scanner which permits application of low cost scanner technology (including the teaching of Laakmann et al in Pat. No. 4,349,843) for military purposes. One such feature is a novel optical system located between the detector array and a polygon scanner. This optical system uses one or two adjacent flat refractor elements tilted relative to the optical axis of the lens system. Each such element occupies one-half of the optical field above a linear detector array to provide an apparent offset two-array configuration of a serially scanning Forward Looking InfraRed (FLIR) system.

A second feature of the present invention is a self-pumping azimuth scanner which can be operated at nominal atmospheric pressure. This unique implementation obviates the prior art requirement for scanner operation in a specially evacuated environment, reduces cost and further increases the desirability of using serial scan technology for demanding military application.

The scanner of the present invention is based on rotating polygon principles to achieve the very high scan rates required in television rate systems. As described in U.S. Pat. No. 4,349,843, polygon scanners should use the lowest number of facets consistent with optical aberrations in order to minimize bearing stresses.

A disclosed embodiment of this invention uses 6 facets and an optical relay between a 60 Hz elevation ate framing mirror and a high speed azimuth polygon scanner as taught by Laakmann, et al. Because of the smaller exit pupil given by the smaller $D\theta$ product for typical military applications, magnification of the optical relay is less critical, but a magnification of greater than one is desirable to minimize field angle inputs into telescopes. Facet numbers larger than 6 could be used but would be detrimental. In view of the centrifual self-pumping features of the scanner, facet numbers less than 6 would be beneficial but must be traded against optical performance degradation and complexity caused by larger field angles scanned in azimuth. Taking this into account, a second embodiment might use 5 facets. The implementation as shown in U.S. Pat. No. 3,764,192 issued to Wheeler could also be used, but is less efficient when designed for self-pumping of vacuum due to the larger number of facets and the associated nodding mirror system that increases polygon diameter and drag even more.

Both scanning components (azimuth and elevation) are mirrors which are not wavelength sensitive. Therefore, adaptation of that portion of the optical system to different spectral regions is achieved by the substitution of lenses of different material in the relay path between the two scanning mirrors. The fact that the scanner is not evacuated in the present invention, facilitates the interchange of lenses in switchable wavelength applications.

The scanner feature permitting use of standard detector arrays is accomplished by a novel optical system between detector array and polygon scanner. In a typical serially scanning Forward Looking InfraRed (FLIR) system there is a collimation lens between detector and facet mirror. This lens has a fixed focal length and an aperture stop close to the lens. Such a lens is, for example, identified by reference numeral 27 in FIG. 1 of the Laakmann, et al patent. This lens must be placed close to the polygon mirror in order to use detector arrays with these Forward Looking InfraRed (FLIRs) systems. Even then array length is limited by pupil growth due to the array field angle and the distance between lens and mirror. The novel optical system of the present invention consists of three lens elements having an accessible image plane available to reconfigure the array geometry, aperture, pupil size, shape and location in order to tailor a standard array to the special requirements of television rate scanning. By appropriate selection of the lens material, the configuration can be adapted to different wavelengths.

Briefly, the present novel lens system comprises a detector lens closest to the detector/dewar package, a second lens of larger aperture forming a relay with a third lens in proximity to the facet mirrors of the rotating polygon and an image plane between the detector lens and the relay lens. Because the optical configuration of the detector is reproduced at the image plane, insertion of optical elements at that plane can reconfigure the array. By way of example, by inserting two tilted flat refractor elements, each over half of a linear detector array and tilted in opposite directions relative to the optical axis, the offset two array configuration of a serially scanning Forward Looking InfraRed (FLIR) system is achieved. By varying the power of the lenses and/or using nonrotationally symmetric lenses, the dewar exit pupil can be adjusted in orthogonal dimensions and overall size and be optically located on the facet mirror, thereby forming an exact match to the scanner pupil and eliminating pupil growth due to array field angle divergence. This allows use of large arrays without penalty.

The self-pumping feature of the scanner is facilitated by the small size of the polygon. For the 6 faceted design the polygon is 1.0 inches in diameter and 0.3 inches in height. For comparison, the 7 faceted implementation of the Wheeler patent needs a diameter of about 2.3 inches to scan 0.8–1.0 inch milliradians D$\theta$ products. The centrifugal pumping function is implemented by rotating the polygon in a polished enclosure with minimum side clearance so that laminar flow is established. The radial acceleration of the air molecules causes a pressure reduction within the rotating air envelope which reduces drag. A venting port to the outside maintains equilibrium. The operating pressure in the vicinity of the bearings is relatively high even during operation, and it returns to atmospheric pressure whenever the scanner is not operating. Evaporation of lubricant is much less of a problem than in the prior art.

OBJECTS

It is therefore a principal object of the present invention to provide a television compatible optical scanner capable of directing laser energy and receiving thermal or laser energy and which is compatible with the standard military telescope interface of 0.8 to 1.0 inch milliradians maximum D$\theta$ product including any pupil wander.

It is an additional object of the invention to provide a scanner of the rotating polygon-type described herein which does not require permanent evacuation of the environment of the rotating polygon thereby preventing excessive evaporation of bearing lubricant while also reducing cost.

It is still an additional object of the present invention to provide an optical scanner which is adapted for use as a laser projection display compatible with both color and black and white television presentations.

It is still an additional object of the present invention to provide an optical scanner which can produce a direct television output without requiring a scan converter and which is compatible with standard, existing military components such as "Common Module" HgCdTe detector arrays, cryogenic collers and afocal telescopes.

BRIEF DESCRIPTION OF THE DRAWINGS

The aforementioned objects and advantages of the present invention will be more fully understood hereinafter as a result of a detailed description of a preferred embodiment of the invention when taken in conjunction with the accompanying drawings in which:

FIG. 1 is an elevational view of the detector optical system and rotating facet mirror of the present invention;

FIG. 2a is a top view of the detecctor optical system and rotating facet mirror of FIG. 1 also illustrating a portion of the prior art optical relay components of the invention;

FIG. 3, comprising FIGS. 3a and 3b, illustrates one example of optical processing of the detector array produced by the novel scanning optics of the invention;

DETAILED DESCRIPTION OF A PREFERRED EMBODIMENT

Figure 2B:
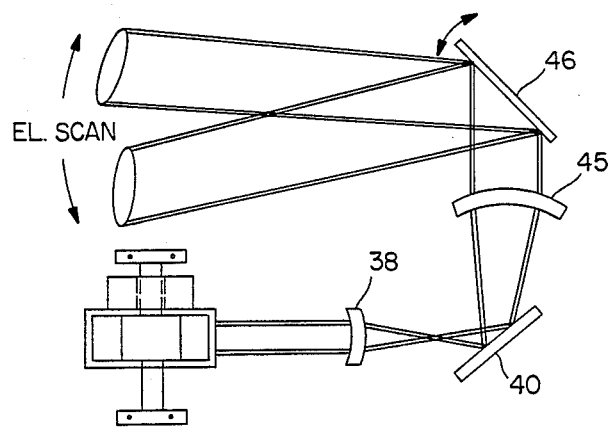
FIG. 2b is an elevational view of the subject matter of FIG. 2a also illustrating the remaining component of the relay optics and the elevation scanning mirror.

For purposes of brevity and clarity, the contents of the following U.S. Patents are hereby incorporated herein by reference: Pat. Nos. 3,723,642 to Laakmann; Pat. No. 3,760,181 to Daly, et al; and Pat. No. 4,349,843 to Laakmann, et al. Although the present invention is not limited to use as a thermal imaging system, the television compatible thermal imaging system of Laakmann, et al disclosed in the last of the three patents listed (4,349,843) is particularly relevant in that the present invention may be deemed to be an improvement upon the invention disclosed in the Laakmann, et al patent.

In consideration of the above, reference will now be made to FIGS. 1, 2a and 2b wherein it will be seen that the improved television compatible optical scanner of the present invention comprises a detector array 12 positioned within a dewar 14 at a selected location relative to a polygon scanner 16 of the type generally disclosed in the Laakmann, et al patent. Polygon scanner 16 is provided with a motor stator 18 which forms part of the drive mechanism to rotate the polygon scanner at the extremely high rate of rotation hereinbelow discussed further. The rotation of polygon scanner 16 is supported by a pair of bearings 20. A convenient implementation of the electric drive is similar to that employed in the Laakmann, et al patent except that the two-pole rotating magnet is placed within the aluminum polygon, for example, as a disk with a thickness of 0.15 inches and of diameter 0.6 inches. The magnet would be preferably of Alnico or samarium cobalt, magnetized in a radial direction. The driving rotation field is created by 6 pole pieces manufactured from ferrites. Each pole piece carries a coil sequentially energized to create the rotating field.

Each surface of polygon scanner 16 is covered with a facet mirror 22 made of suitable material for the wavelength of the optical energy being scanned. Each such facet mirror 22 covers an entire surface of the polygon. The polygon scanner 16 provides the same function as the polygon scanner of the Laakmann, et al patent, namely, azimuth scanning for the imaging system.

The improved television compatible optical scanner 10 of the present invention also comprises a unique lens combination positioned between the detector array 12 and the polygon scanner 16. This lens system comprises a detector lens 24, a reflective cold stop 42 having a radius about equal to the focal length of lens 24 and positioned just behind lens 24, a relay lens 26 and a scanner lens 28. An image plane is created between lens 26 and a lens 28 at which point the optical configuration of the detector 12 is reproduced. Accordingly, insertion of optical elements at the image plane, in effect reconfigures the detector array. In the particular embodiment illustrated, a pair of refracting flat plates 30 and 32 are inserted at the image plane. Each such refractive flat plate covers half of the linear detector array and the two plates are tilted at a selected angle relative to one another so that the refractive offset created by the two plates differs. As a consequence of this unique configuration of refractive elements 30 and 32, a unitary linear detector array 12 is made to appear as an offset two-array configuration of a serially scanning system as shown in FIG. 3 and as described generally in Patent No. 3,723,642 to Laakmann. Dewar 14 provides an internal cold shield 41.

In the general case of a non-circular dewar entrance aperture or reflective cold stop 42 and a desired circular exit pupil, at least lenses 24 and 26 are generalized aspherics or "landscape" lenses in function. As the optical configuration of the detector is reproduced at the image plane, insertion of optical elements at that plane reconfigures the array. By varying the power of such non-rotational symmetrical lenses the deward exit pupil can be adjusted in orthogonal dimensions and in overall size and be optically located on the facet mirror 22 thereby forming an exact match to the scanner pupil eliminating pupil growth due to array field angle divergence. This allows the use of large detector arrays without penalty.

It must be pointed out here that the field angle divergence due to the array after azimuth scanning (looking toward the system exit pupil) is not of any consequence in serially scanning Forward Looking InfraRed (FLIR) systems. Therefore, a detector array of for example 30 degree angular (horizontal) extent can be scanned through the 50.4 degree azimuth angle of television compatible 6 faceted scanners and subsequent telescopes without any concern over any vignetting affecting the 50.4 degree displayed angle, even though the detectors see a total angle of 80.4 degrees. No provisions need be made for optical angles other than those being scanned by the mirrors. This can be shown by detail timed ray traces. However, it suffices here to point out that it logically follows from the definition of a serially scanning Forward Looking InfraRed (FLIR) system: All detectors sequentially see all points of the image. Since the only thing that needs to be displayed are all points of the image it follows that whatever the detectors see outside the desired image is irrelevant, as long as there is no crosstalk due to imperfect blanking of detectors scanned out of the viewed scene. All of the optical elements including lenses 24, 26 and 28 and tilt plates 30 and 32 are made of an appropriate material for the wavelength of the optical energy being scanned. For the 3.5-12 micron wavelength range, which is of principal interest in the thermal imaging application of the present invention, the detector focusing and relay optics are typically refractive and constructed from optical materials transparent to the wavelength of interest for the indicated infrared range. Germanium is one possible selection of material. Other possibilities for materials that would be suitable for use in the present invention include zinc sulfide, zinc selenide and diamond.

The high speed rotating polygon scnaner must deliver 7,875 scans-per-second to provide television compatibility. For a six-facet mirror as shown in the embodiment of the present invention illustrated in FIGS. 1, 2a and 2b, this scan rate corresponds to a polygon scnnaer rotation rate of 78,750 RPM. The smaller size of the scanner entrance pupil and/or field angle for use in military applications allows for small $D\theta$ products, namely, on the order of 0.8 to 1.0 where D is the effective entrance diameter in inches of the collimated beam and $\theta$ is the detector azimuth angular subtense in milliradians. Polygon scanners should use the lowest possible number of facets consistent with optical aberrations in order to minimize bearing stresses. Like the invention disclosed in the Laakmann, et al patent, the illustrated embodiment of this invention also uses 6 facets and an optical relay lens system between the high speed azimuth scanning polygon and a 60 Hz. elevation rate mirror (not shown). However, because of the smaller exit pupil given by the smaller $D\theta$ product for military applications, magnification of the relay lens system is less critical than it is in the earlier described system of Laakmann, et al which discloses a $D\theta$ product of 2.1. However, magnification of greater than 1 is still desirable to minimize field angle inputs into subsequent telescopes. Facet numbers larger than 6 could be used but would be detrimental in terms of the mechanical aspects regarding the bearing stress of the polygon scanner. In view of the self-pumping features of the scanner as described hereinafter in more detail, facet numbers less than 6 would be beneficial, but would result in degradation of optical performance and increased optical complexity caused by larger field angle scan in azimuth. However, it is believed that a selection of a 5 facet polygon scanner would also be readily achievable and a good alternative embodiment in the present invention.

A 5 facet polygon scanner is shown in dotted lines in FIG. 2a.

The azimuth scan angle created by the facet mirror in television rate scanners is given by the formula Scan Angle=$0.42 \times 360 \div 0.5N$ where N is the number of facets. The 0.42 factor is a result of the television standard line time of 63 microseconds with an active (unblanked) time of 53 microseconds in 525/625 line standard television resulting in a "active" time of 84% and leaving 16% to accomplish retrace of the flyback circuits to start a new television line. Because two television lines are generated from two detectors or two arrays simultaneously, and one is delayed and inserted sequentially to realize continuous scanning; 84% active scanning at the video output corresponds to 42% active scanning optically for a scan efficiency of 42% without vignetting of the beam.

For a particular facet number, size of the polygon is determined by the size of the optical bundle projected onto, and scanned by the mirror. The diameter of the bundle is a function of the $D\theta$ product, but also of the actual choice of $\theta$. Because of the use of afocal optical relays between azimuth and elevational scanners as disclosed in the Laakmann, et al patent, and additional telescopes between the entire scanner and the outside world, $\theta$, that is the detector azimuth angle subtense, can be chosen independently of resolution and detector parameters. The larger the choice of $\theta$ for a constant $D\theta$ product, the smaller the facet mirror becomes at constant scan efficiency of 42%. The ratio of azumuth scan angle divided by $\theta$ is proportional to bandwidth and provides the means to choose the facet mirror size. Television bandwidth is typically a maximum of 4.5 Mhz in the video passband. However, almost all closed circuit television systems, video tape recorders and mass produced broadcast receivers are capable of a maximum of 3 Mhz video response. The biggest limitation is that of typical non-studio video cassette recorder equipment currently in use.

In choosing the system bandwidth and therefore in effect, selecting facet mirror size, bandwidth and signal-to-noise ratio must be traded against one another and a compromise effected. In a typical embodiment of the present invention, $\theta$ is chosen to be within the range of 3.2 to 4.0 milliradians and a projected beam size of 0.25 inches diameter. This results in a detector cutoff frequency of between 4 and 5 Mhz. Nominal resolution frequency for targets equal to detector size would be $\frac{1}{2}$ of these values or well within the passband of typical video components. There is no point in choosing a smaller $\theta$ as any additional resolution or bandwidth cannot be preserved in equipment usage that involves frequency use of video cassette recorders for demonstration or training. In addition, greater bandwidth would mean smaller detector size which would reduce the thermal signal-to-noise ratio which is equally undesirable.

Detailed optical design in accordance with the above parameters, forcing the input and output axis of the optical system to be as closely aligned as possible (55 degrees angular separation in the present embodiment) and also using detector relay optics to negate beam diversions from the array azimuth angle, produce a surprisingly small facet mirror of 1.0 inches in diameter. Furthermore, because the beam diameter is 0.25 inches, a polygon facet mirror height of 0.3 inches is sufficient to meet these requirements.

The relay system between the polygon azimuth scanner and the elevation scanner as well as the elevation scanner itself follow the teachings of Laakmann, et al. The optical relay between the two scanners may or may not be used off-axis as the need for absolute narcissus reflection control is not as significant in non-radiometer applications. Image plane blackbodies may or may not be used also depending upon the specific application. If the scanner is used for visible light, the germanium optics would need to be replaced by glass. Optical materials exist that can be used in the infrared and visible ranges simultaneously for multi-spectral applications.

If the invention is implemented using the standard "common module" 60 element linear array with a detector size of 0.0023 (azimuth)×0.0016 (elevation) inches to provide an infrared imager, lens 24 is designed to have a focal length of approximately 1.2 inches and a clear diameter of at least 0.5 inches. Reflective circular cold stop 42 would have a radius of about 1.0 to 1.2 inches and an internal diameter of 0.5 inches. This creates an image field of view of 2.0 milliradians in azimuth and 1.4 milliradians in elevation. The relay formed by lens 26 and lens 28 would have a magnification of 0.5 as seen from the detector and project the pupil of 0.25 inches diameter onto the facet mirror 22 with an image field of view ($\theta$) of 4.0 milliradians. The elevation image field of view is 2.8 milliradians. This dimension corresponds to an angular size almost exactly equal to that of two television lines. More specifically, there are 485 displaced television lines in the apparent elevation height of 50.4×0.75 degrees=37.8 degrees. Since each television line represents a spatial sample of the image, two samples per detector size are provided which is the ideal sampling density as suggested by the Nyquist sampling criteria. The total array length of the standard 60 element array is 0.24 inches. The angular extent of the array as seen by the facet mirror is therefore 0.24÷0.6 radians or plus or minus 16.3 degrees. The one inch diameter 6 faceted polygon, combined with the minimum separation between the two optical systems, is chosen to accept this array but no more.

The F number of the relay formed by lenses 26 and 28 is chosen for convenience of folding. For an F/4 relay, image plane length would be 1×0.24÷0.6=0.40 inches. Angular separation in elevation between the two 30 element sub-arrays created by the split refractor plates 30 and 32 must be equal to the angular spacing of sequential lines in a television field. There are approximately 242 displaced lines in a television field and the apparent optical height of the field is 50.4×0.75=37.8 degrees or 0.653 radians. Since the focal length of lens 28 is 1.0 inches, physical separation is 0.653÷242=0.0027 inches. Therefore, the tilted refractors 30 and 32 must each shift one-half of the focal plane 0.00135 inches from the original center. For flat plates constructed from germanium and having a thickness of 0.01 inches, the tilt angle from a plane perpendicular to the optical axis would be plus or minus 10 degrees as computed by Snells law. For a single refractor a thickness of 0.02 inches tilted 10 degrees would also produce the required shift. It is desirable to use a relatively thin plate centered axially on the image plane 20 that a clean break between the sub-arrays is effected. For a 0.02 inch thick germanium plate centered on the image plane, defocusing at the surface due to the F/4 optical system is only 0.0006 inches so that the sub-arrays can be created without the loss of a single detector. However, loss of a detector in a serially scanning system is not critical.

FIG. 3a illustrates the standard single linear array of the "common module" such as the type having 60 elements. FIG. 3b illustrates the resultant image field of view produced by the scanning effect of the polygon scanner 16 in azimuth and the associated 60 Hz elevation mirror of the type disclosed in the Laakmann, et al patent. As seen in FIG. 3b, each serial scanner "sees" two linear 30 element arrays displaced in elevation by one element width because of the effect of the refractor plates 30 and 32. These split arrays 12' are repeatedly scanned in a serial manner with the changing elevation angle and the corresponding rotation of polygon scanner 16 to produce an overall field of view.

The signal processor for the 60 signals created follows the teaching of Laakmann Pat. No. 3,723,642 using a delay line processor as disclosed therein. This is the preferred implementation because it allows initial processing at the lowest possible level and thereby provides a system having a large dynamic range for subsequent control and processing in a single channel. Other implementations could use conventional digital processing employing semiconductor delay and storage elements with some reduction in dynamic range, but possible compensating advantages in size and cost. Implementation of the elevation framing mirror is the same as that disclosed in Laakmann, et al.

FIG. 2b illustrates that the elevation optics are identical to FIG. 2 of Laakmann et al which has been incorporated herein by reference. Elements 38 and 45 and fold mirror 40 form the optical relay between the first scanner 16 and the second scanner 46.

However, because the D$\theta$ produce is in the range of 0.8 to 1.0 as opposed to 2.1 as disclosed in that earlier issued patent, the mirror size may be made smaller. The 92% active scan time of standard television in the elevation dimension is realizable with this servo driven mirror. Previous practice in television scanning systems has been to accept scan efficiencies of 75–80% and simply blank the remaining screen or use it to display electronic symbology.

Another important distinguishing feature between the present invention and the aforementioned disclosure of Laakmann, et al is in the provision of a polygon scanner which does not require any form of permanently evacuated environment. As a result, the cost and complexity of the system of the present invention are significantly reduced in comparison to such prior art systems. Furthermore, the ambient environment of the polygon scanner makes it possible to more readily modify the optical system between the detector array 12 and the polygon scanner 16 to alter the pupil size or make other use of the image plane by optically modifying the detector array geometry in association with other forms of detector signal processing. Avoidance of the permanent evacuation of the environment in which the polygon scanner 16 is positioned, is made possible by the unique relationship between the scanner 16 and the surrounding housing 34 and vent 36. More specifically, measurements have shown that polygon scanner 16 when mounted in a polished cavity with radial and axial clearance (except for optics ports) of 0.02 inches, achieves an aerodynamic drag of 4 watts at 78,750 RPM. The cavity is vented by means of vent 36 to the outside at a point adjacent the facet mirror circumference and produces a partial vacuum. This 4 watt drag loss is compatible with integral synchronous electric drive where the polygon scanner is configured to be a rotating magnet as well as an optical component. The electric motor therefore does not create additional drag. The reduced dimensions in the clearance between the scanner and the housing and associated venting produces the partial vacuum between the housing 34 and the scanner 16. It is believed that a further reduction in drag loss could be achieved by using even smaller clearances.

It will now be understood that what has been disclosed herein comprises an optical scanner, directly compatible with television imaging or displaying, having a unique polygon azimuth mirror scanner which obviates the prior art requirement for atmospheric evacuation and a unique optical system between the azimuth scanner and detector array which permits selected optical modification of detector geometry. The azimuth scanner is designed to be of limited dimensions and is housed in a vented housing within minimal clearance to produce a self-pumping effect which is sufficient to overcome the reduced atmospheric drag. The scanner/detector optical system provides a detector image plane where in a disclosed embodiment two flat refractor plates, oriented at different angles relative to the optical axis, effectively convert a standard linear array into a two-offset array. The resultant system comprises an optical scanner especially suited to military applications and existing standardized military components, but which provides the significant cost advantages of serially scanning systems. Those having skill in the relevant arts will understand further that although the above exemplary description emphasizes infrared thermal imaging applications, other optical implementations employing the advantageous features of the invention are equally feasible. By way of example, in a projection display application, the system would comprise at least one of the described scanners, one to six lasers depending on desired frame rate and television format, one to six laser and intensity modulators and the associated synchronization circuit and beam and video splitters. Such a projection display would be suitable for very large screen projection beyond the capability of CRT displays. Operation as a laser scanner reverses entry and exit ports of the scanner, but does not change the basic configuration of the invention.

Figure 4:
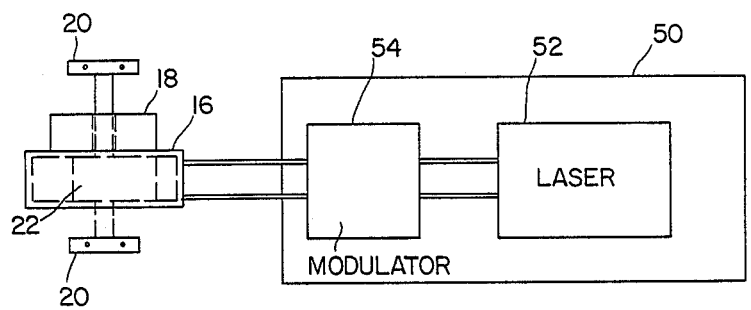
FIG. 4 illustrates a laser scanner configuration of the invention.

FIG. 4 illustrates that a laser scanner would use the same scanner and substitute an intensity modulated radiant energy source 50 comprising a laser 52 and modulator 54 for the detector and associated optics. In general, the scanner feature of being able to adapt to large field angles at the detector exit (laser entry) port is less important in these applications. However, it is important in laser radar application where laser entry and detector exit port are the same and detector arrays are used. The invention is to be limited only by the appended claims.

I claim:

1. An afocal opto-mechanical scanner configured to produce television rate two-dimensional scans; the scanner comprising:

a multifaced polygon mirror for spinning around an axis centered and parallel to the mirror faces and defining a first scan direction for optical energy;

a second scan mirror scanning in a second scan direction substantially orthogonal to said first scan direction;

an optical relay between said first and second scan mirrors relaying the optical energy between the first scan mirror and the second scan mirror to create a non-astigmatic two-dimensional scan;

an enclosure for housing said polygon mirror substantially at atmospheric pressure when at rest and providing a reduction in operating pressure through centrifugal pumping action when at operating speed without requiring a separate pump.

2. An opto-mechanical scanner according to claim 1 where the said multifaced mirror is capable of generating approximately 7,875 optical scans per second and where said second scan mirror operates at approximately 60 scans per second.

3. An opto-mechanical scanner according to claim 2 in combination with a detector having at least two elements and focusing optics interposed between said detector and said polygon mirror to form an electronic image having parameters which can be adjusted to conform exactly to established television video specifications.

4. An opto-mechanical scanner according to claim 2 in combination with an intensity modulated source of radiant energy to form an electronic display in response to an input signal, said display accepting standard television video.

5. An opto-mechanical scanner according to claim 2 in combination with a source of radiant energy and at least one detector of such radiant energy to form an electronic image of the source of radiant energy, said electronic image being compatible with real time commercial television.

6. An opto-mechanical scanner according to claim 2 having a polygon with 6 facets to produce a non-vignetted scan angle from each facet that can be adjusted to be 50.4 degrees.

7. An opto-mechanical scanner according to claim 2 having a polygon with 5 facets to produce a non-vignetted scan angle from each facet that can be adjusted to be 60.5 degrees.

8. An imaging scanning system in accordance with claim 3 where said detector comprises an array of sensitive elements and said focusing optics comprises an imaging lens and an afocal relay lens system, said afocal relay lens system being adapted to reimage a collimated detector pupil onto a scanner pupil.

9. An imaging scanning system in accordance with claim 8 wherein said afocal relay lens system is adapted to vary the size of the collimated detector pupil so that it is compatible with the scanner pupil.

10. An imaging scanning system in accordance with claim 8 wherein said afocal relay lens system is adapted to vary the shape of the collimated detector pupil so that it is compatible with the scanner pupil.

11. An opto-mechanical scanner in accordance with claim 8 where the size of the collimated pupil scanned by said polygon mirror is approximately 0.25 inches.

12. An opto-mechanical scanner in accordance with claim 8 where the product of the horizontal angular size of said detector and the pupil diameter is between 0.8 and 1.0 inches milliradians.

13. An opto-mechanical scanner in accordance with claim 8 where the horizontal dimension of the detector is chosen to create video frequencies that fall within the video passband of standard television systems.

14. An opto-mechanical scanner in accordance with claim 8 where the vertical dimension of the detector covers approximately two television lines of the image created.

15. An imaging scanning system having a television rate afocal scanner and comprising:
 a detector array and detector collimating optics;
 an afocal relay system interposed between said detector collimating optics and said afocal scanner to relay a detector collimated pupil onto said afocal scanner; and
 means to modify the image of said detector array by introducing selected optical elements into the image plane of said relay system.

16. An imaging scanning system in accordance with claim 15 where said afocal relay system comprises non-rotationally symmetric lenses to reconfigure the detector aspect ratio at said scanner.

17. An imaging scanning system in accordance with claim 15 where said afocal relay system comprises non-rotationally symmetric lenses to reconfigure the pupil aspect ratio at said scanner.

18. An imaging scanning system having a television rate afocal scanner and comprising:
 a detector array and detector collimating optics;
 a afocal relay system interposed between said detector collimating optics and said afocal scanner to relay a detector collimated pupil onto said afocal scanner; and
 means to modify the image of said detector array by introducing selected optical elements into the image plane of said relay system;
 wherein said detector array comprises a unitary linear array and said image modifying means comprises optical distorting elements to convert said linear array into two offset linear arrays for producing a standard television scan format.

19. An imaging scanning system in accordance with claim 18 where said optical distorting elements comrise a pair of tilted flat refractors.

20. An imaging scanning system in accordance with claim 18 where said detector array is sensitive in the 8–12 micrometer wavelength band.

21. In a television rate compatible optical scanner of the type having a first mirror having at least one mirror surface, means for mounting the first mirror for movement about a first axis for scanning in a first direction, a second mirror having at least one mirror surface, means for mounting the second mirror for movement about a second axis for scanning in a second direction, the first and second directions being non-parallel, a detector positioned relative to the first and second mirrors for receiving a pre-selected field of view of an image scanned in the first direction by the first mirror and in the second direction by the second mirror; the improvement comprising:
 an optical system interposed between said detector and said first mirror, said optical system defining an image plane and having at least one optical element located substantially at said image plane for altering the apparent shape of said detector.

22. The improvement recited in claim 21 wherein both said first and second mirrors are housed in an ambient environment without evacuation.

23. In a television rate compatible optical scanner of the type having a first mirror having at least one mirror surface, means for mounting the first mirror for movement about a first axis for scanning in a first direction, a second mirror having at least one mirror surface, means for mounting the second mirror for movement about a second axis for scanning in a second direction, the first and second directions being non-parallel, a detector positioned relative to the first and second mirrors for receiving a pre-selected field of view of an image scanned in the first direction by the first mirror and in the second direction by the second mirror; the improvement comprising:
 an optical system interposed between said detector and said first mirror, said optical system defining an image plane and having at least one optical element located substantially at said image plane for altering the apparent geometry of said detector;
 wherein said detector comprises a linear array of detector elements and where said apparent geometry of said detector comprises at least a pair of linear arrays of detector elements displaced from each other along said second direction.

24. The improvement recited in claim 23 wherein said optical element comprises at least one flat reflector plate selectively positioned at a non-zero angle relative to said image plane.

25. In a television rate compatible optical scanner of the type having a first mirror having at least one mirror surface, means for mounting the first mirror for movement about a first axis for scanning in a first direction, a second mirror having at least one mirror surface, means for mounting the second mirror for movement about a second axis for scanning in a second direction, the first and second directions being non-parallel, a detector positioned relative to the first and second mirrors for receiving a pre-selected field of view of an image scanned in the first direction by the first mirror and in the second direction by the second mirror; the improvement comprising:
- an optical system interposed between said detector and said first mirror, said optical system defining an image plane and having at least one optical element located substantially at said image plane for altering the apparent geometry of said detector;
- both said first and second mirrors being housed in an ambient environment without evacuation; and
- wherein said movement of said first mirror is rotation and further comprising means responsive to said rotation to reduce the pressure at said first mirror below atmospheric pressure.

26. In a television rate compatible optical scanner of the type having a first mirror having at least one mirror surface, means for mounting the first mirror for movement about a first axis for scanning in a first direction, a second mirror having at least one mirror surface, means for mounting the second mirror for movement about a second axis for scanning in a second direction, the first and second directions being non-parallel, a detector positioned relative to the first and second mirrors for receiving a pre-selected field of view of an image scanned in the first direction by the first mirror and in the second direction by the second mirror; the improvement comprising:
- an optical system interposed between said detector and said first mirror, said optical system defining an image plane and having at least one optical element located substantially at said image plane for altering the apparent geometry of said detector;
- wherein both said first and second mirrors are housed in an ambient environment without evacuation;
- wherein said movement of said first mirror is rotation and further comprising means responsive to said rotation to reduce the pressure at said first mirror below atmospheric pressure;
- said rotation responsive means comprising a vented housing conforming to within 0.02 inches of the rotational path of said first mirror whereby said rotation produces a partial vacuum at said first mirror.

* * * * *